(12) United States Patent
Tseng et al.

(10) Patent No.: US 9,511,454 B2
(45) Date of Patent: Dec. 6, 2016

(54) WELDING ACTIVATED FLUX FOR STRUCTURAL ALLOY STEELS

(71) Applicant: NATIONAL PINGTUNG UNIVERSITY OF SCIENCE & TECHNOLOGY, Pingtung County (TW)

(72) Inventors: Kuang-Hung Tseng, Pingtung County (TW); Nai-Shien Wang, Pingtung County (TW)

(73) Assignee: NATIONAL PINGTUNG UNIVERSITY OF SCIENCE & TECHNOLOGY, Pingtung County (TW)

(*) Notice: Subject to any disclaimer, the term of this patent is extended or adjusted under 35 U.S.C. 154(b) by 171 days.

(21) Appl. No.: 14/572,073

(22) Filed: Dec. 16, 2014

(65) Prior Publication Data

US 2016/0167178 A1   Jun. 16, 2016

(51) Int. Cl.
*B23K 35/36* (2006.01)
*B23K 35/02* (2006.01)
*B23K 35/362* (2006.01)

(52) U.S. Cl.
CPC ....... *B23K 35/3607* (2013.01); *B23K 35/0255* (2013.01); *B23K 35/3601* (2013.01); *B23K 35/3602* (2013.01); *B23K 35/362* (2013.01); *B23K 35/3605* (2013.01); *B23K 35/3608* (2013.01)

(58) Field of Classification Search
CPC ........... B23K 35/3607; B23K 35/0255; B23K 35/3608; B23K 35/3605; B23K 35/3601
See application file for complete search history.

(56) References Cited

U.S. PATENT DOCUMENTS 1,329,413 A   2/1920   Kicklighter
2,053,216 A   9/1936   Deming

FOREIGN PATENT DOCUMENTS

TW   200422435 A   11/2004

OTHER PUBLICATIONS

Huang, "Argon-Hydrogen Shielding Gas Mixtures for Activating . . . ", Arc Welding, Metallurgical and Materials Transactions A, Jul. 7, 2010, pp. 2829-2835, vol. 41, Springer, USA.

*Primary Examiner* — Rebecca Lee
(74) *Attorney, Agent, or Firm* — Muncy, Geissler, Olds & Lowe, P.C.

(57) ABSTRACT

A welding activated flux for structural alloy steels including 40-50 wt % of $SiO_2$, 25-30 wt % of $MoO_3$, 5-10 wt % of $TiO_2$ and 10-20 wt % of $Cr_2O_3$ is disclosed. Accordingly, with the use of the welding activated flux, the depth of the weld is significantly increased, thereby enhancing the mechanical strength of the weldment and reducing the distortion of the weldment.

3 Claims, 12 Drawing Sheets

WELDING ACTIVATED FLUX FOR STRUCTURAL ALLOY STEELS

BACKGROUND OF THE INVENTION

1. Field of the Invention

The present invention generally relates to an activating flux and, more particularly, to a welding activated flux for structural alloy steels.

2. Description of the Related Art

Structural alloy steel is a low alloy steel with carbon contents between 0.2% and 0.7%. Structural alloy steels contain various alloy elements such as nickel, chromium and molybdenum, improving the corrosion resistance, the mechanical strength at high temperature, the impact toughness at low temperature and the mass effect in quenching of steels. Nowadays, structural alloy steels are widely used in high-mechanical strength and high-impact toughness designs, such as buildings, bridges, motorcycle skeletons, turbine blades, shafts, crankshafts and high-tensile bolts; and therefore, the welding procedures and welding rods (or welding wires) should be adjusted according to the properties of structural alloy steels, avoiding fractures in the weld zone when the weldment is subjected to loads.

Tungsten inert gas (TIG) welding is one of the most popular processes for joining structural alloy steels because it produces a high-quality weld. The heat for TIG welding is generated by an electric arc maintained between a tungsten electrode and the workpiece to be joined. The tungsten electrode and molten metal are protected from atmospheric contamination by an envelope of inert gas (such as argon or helium) during heating and subsequent cooling. The welding arc melts the workpiece and a conventional welding rod (or a conventional welding wire) to form a welding pool. A weld is formed after the welding pool cools and solidifies, and a weldment is obtained. The chemical composition of the conventional welding rod (or the chemical composition of the conventional welding wire) should be used corresponding to the chemical composition of the workpiece to be joined, which is understood by a person having ordinary skill in the art. However, TIG welding process is an arc welding process with lower power density of the heat source, the welding pool thus formed is wide and shallow, resulting in insufficient depth of the weld and decreased mechanical strength of the weldments. Therefore, the TIG welding process is not suitable for joining the workpieces with thickness over 3 mm.

Referring to FIG. 1A, to join the workpieces with thickness over 3 mm by the TIG welding process, sides 91, 91' of two workpieces 9, 9' are first milled by a cutter "M" to form bevel faces 92, 92', respectively. Referring to FIGS. 1B and 1C, a groove is formed at the butt joint of the bevel faces 92, 92' of the workpieces 9, 9' for carrying out the TIG welding process by using the conventional welding rod (or the conventional welding wire) "W" and the tungsten electrode "E." A weld 93 is formed after welding. Formation of the bevel faces 12, 12' increases the depth of the weld 93. However, formation of the bevel faces 12, 12' also increases the width of the weld 93. In addition, the heat-affected zone (HAZ) formed by the welding heat source has a larger range due to the formation of the bevel faces 12, 12'; thereby increasing distortion of the weldments and decreasing the mechanical strength of the weldments. Moreover, formation of the bevel faces 12, 12' also extends operation time and increases manufacturing costs including costs of labors, welding rods (or welding wires) and welding gases.

In light of this, it is necessary to provide a welding activated flux for structural alloy steels.

SUMMARY OF THE INVENTION

It is therefore the objective of an embodiment of the present invention to provide a welding activated flux for structural alloy steels with increased depth of the weld and decreased the width of the weld.

It is another objective of an embodiment of the invention to provide a welding activated flux for structural alloy steels, which enhances the mechanical strength of the weldment and reduces the distortion of the weldment.

The present invention fulfills the above objectives by providing a welding activated flux for structural alloy steels, which includes 40-50 wt % of $SiO_2$, 25-30 wt % of $MoO_3$, 5-10 wt % of $TiO_2$ and 10-20 wt % of $Cr_2O_3$.

In a preferred form shown, the welding activated flux for structural alloy steels further includes 5-10 wt % $FeF_3$.

In a preferred form shown, the welding activated flux for structural alloy steels includes a plurality of powdered particles each having an average diameter of 53-88 μm.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1A:
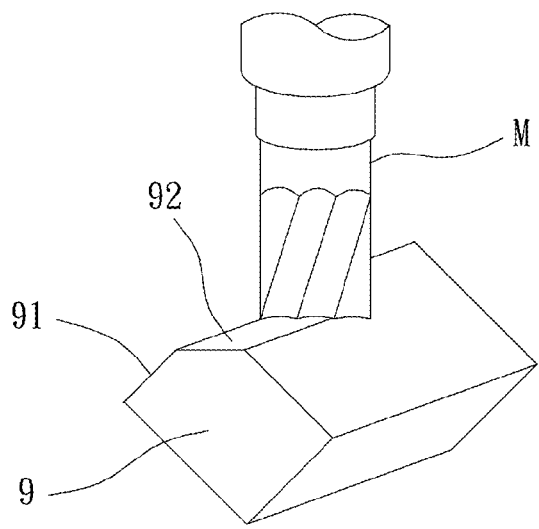
FIG. 1A shows the pre-processing on a workpiece to be joined with another workpiece by the TIG welding process.
Figure 1B:
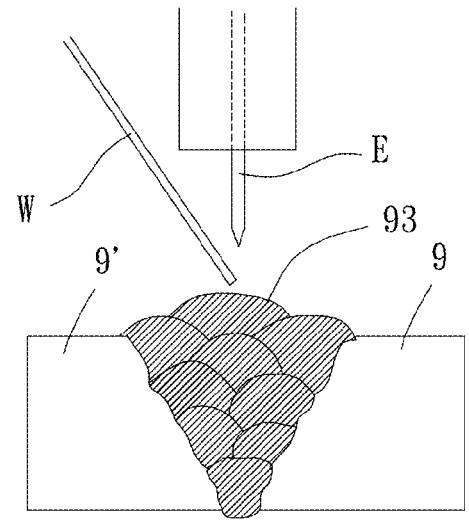
FIG. 1B shows a cross-sectional view of two workpieces being joined by the TIG welding process.
Figure 1C:
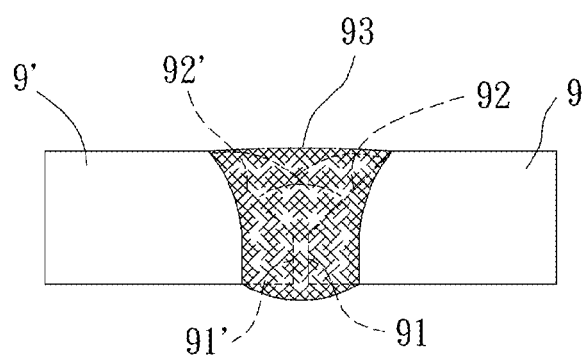
FIG. 1C shows a cross-sectional view of a weld formed by the two joining two workpieces by the TIG welding process.

In the various figures of the drawings, the same numerals designate the same or similar parts. Furthermore, when the term "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

The structural alloy steels can be selected, but not limited, from nickel steels (AISI 23xx or AISI 25xx series); nickel-chromium steels (AISI 31xx, AISI 32xx, AISI 33xx or AISI 34xx series); molybdenum steels (AISI 40xx or AISI 44xx series); chromium-molybdenum steels (AISI 41xx series); nickel-chromium-molybdenum steels (AISI 43xx, AISI 43BVxx, AISI 47xx, AISI 81xx, AISI 86xx, AISI 87xx, AISI 88xx, AISI 93xx, AISI 94xx, AISI 97xx or AISI 98xx series); nickel-molybdenum steels (AISI 46xx or AISI 48xx series); chromium steels (AISI 50xx, AISI 51xx or AISI 52xx series); chromium-vanadium steels (AISI 61xx series); high-strength, low-alloy steels (AISI 9xx series), which is understood by a person having ordinary skill in the art.

A welding activated flux for structural alloy steels according to an embodiment of the invention includes $SiO_2$ (silicon dioxide), $MoO_3$ (molybdenum trioxide), $TiO_2$ (titanium dioxide) and $Cr_2O_3$ (chromium(III) oxide). The welding activated flux can be melted into a welding pool. A weld is formed after the welding pool cools and solidifies, and a weldment is obtained. The use of the welding activated flux leads to an increase in the depth of the weld and a decrease in the width of the weld.

Specifically, in this embodiment, the welding activated flux can include 40-50 wt % of $SiO_2$, effectively increasing the depth of the weld and decreasing the width of the weld. The welding activated flux further includes 25-30 wt % of $MoO_3$, assisting the enhancement of the depth of the weld. Furthermore, the welding activated flux can also include 5-10 wt % of $TiO_2$, not only assisting the enhancement of the depth of the weld but also improving the surface smoothness of the weld. In addition, the welding activated flux can further includes 10-20 wt % of $Cr_2O_3$, assisting the enhancement of the depth of the weld and improving the corrosion resistance of the weld.

As a result, the welding activated flux of the embodiment can be used for structural alloy steels, effectively increasing the depth of the weld. With such performance, with the use of the welding activated flux, the TIG welding process is suitable for joining the workpieces with thickness over 3 mm without the formation of the bevel faces.

Moreover, the welding activated flux of the embodiment can further includes 5-10 wt % of $FeF_3$ (iron(III) fluoride), decreasing the formation of flux slag on the surface of the weld. That is, the addition of $FeF_3$ in the welding activated flux can assist the improvement of the surface smoothness of the weld, providing a satisfactory surface appearance.

The percentage of the ingredients of the welding activated flux can be adjusted according to types or properties of the structural alloy steels to be joined, welding parameters, which is understood by a person having ordinary skill in the art.

Moreover, in this embodiment, $SiO_2$, $MoO_3$, $TiO_2$, $Cr_2O_3$ and $FeF_3$ can be powdered particles each having an average diameter of 53-88 μm, improving fining mixing between $SiO_2$, $MoO_3$, $TiO_2$, $Cr_2O_3$ and $FeF_3$. With such performance, the welding activated flux can be easily coated on the surface of the workpiece. Moreover, the micro-scale powdered particles can be easily melted by the welding arc, and therefore, uniform joint penetration throughout the weld can be significantly improved.

In this embodiment, the welding activated flux can be used for any conventional arc welding processes. For example, the welding activated flux can be evenly coated on the surface of the workpieces with thickness over 3 mm, followed by the TIG welding process.

Figure 2:
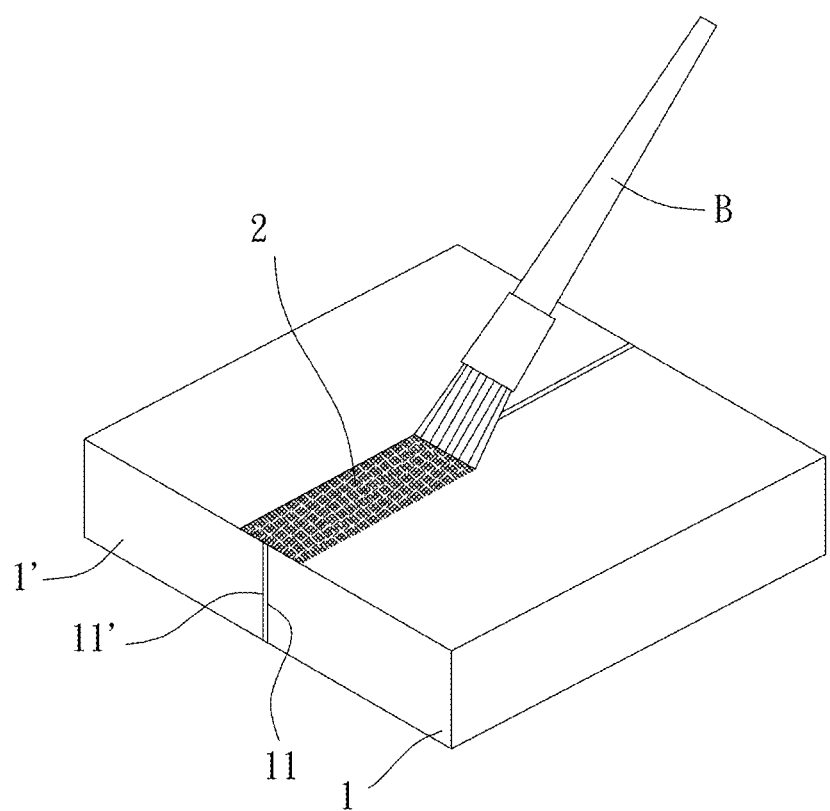
FIG. 2 shows the welding activated flux according to an embodiment of the present invention coating on surfaces of two workpieces to be joined by the TIG welding process.

With reference to FIG. 2, when joining two workpieces 1, 1' using the TIG welding process, a joint of the two workpieces 1, 1' are formed between sides 11, 11'. A welding activated flux 2 is mixed in a liquid carrier (or a gel carrier) to form a paste-like flux, and a thin layer of the paste-like flux is coated onto the joint of the two workpieces 1, 1' by a brush "B" to allow subsequent welding of the two workpieces 1, 1' using a welding torch with a tungsten electrode.

Figure 3A:
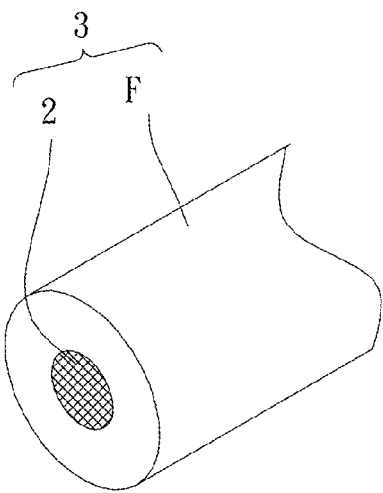
FIG. 3A shows a partial, enlarged, perspective view of a welding rod (or a welding wire) utilizing the welding activated flux according to an embodiment of the present invention.
Figure 3B:
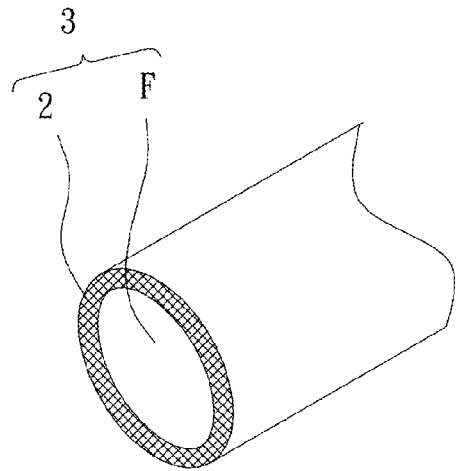
FIG. 3B shows a partial, enlarged, perspective view of another welding rod (or another welding wire) utilizing the welding activated flux according to an embodiment of the present invention.
Figure 3C:
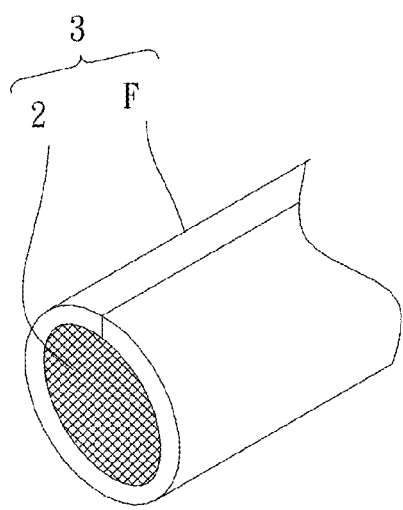
FIG. 3C shows a partial, enlarged, perspective view of yet another welding rod (or yet another welding wire) utilizing the welding activated flux according to an embodiment of the present invention.
Figure 3D:
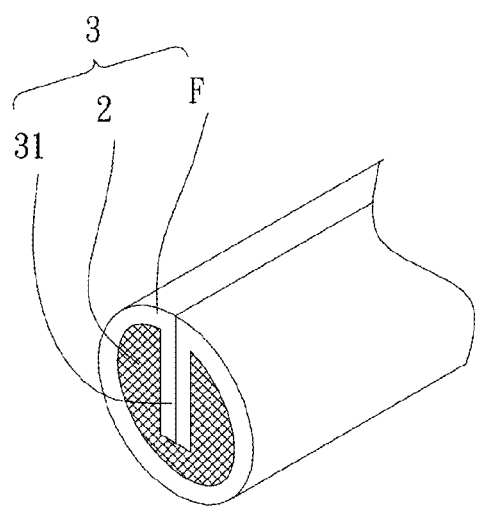
FIG. 3D shows a partial, enlarged, perspective view of still another welding rod (or still another welding rod) utilizing the welding activated flux according to an embodiment of the present invention.

Moreover, with reference to FIGS. 3A, 3B, 3C and 3D, a filler metal "F" is combined with the welding activated flux 2 to form an activated welding rod (or an activated welding wire) 3. The filler metal "F" can be varied according to the types of the workpieces to be jointed and other needs. In FIG. 3A, the welding activated flux 2 is filled in the hollow, cylindrical filler metal "F". In FIG. 3B, the welding activated flux 2 is coated around the cylindrical filler metal "F." In FIG. 3C, a sheet of filler metal "F" is rolled into an annular form and envelopes the welding activated flux 2. In FIG. 3D, a sheet of filler metal "F" is rolled into an annular form and envelopes the welding activated flux 2. Furthermore, the filler metal "F" includes at least one inwardly extending end 31 received in the welding activated flux 2. With such performance, the welding activated flux 2 is suitable for applying in automatic welding operation, improving the process efficiency.

Figure 4A:
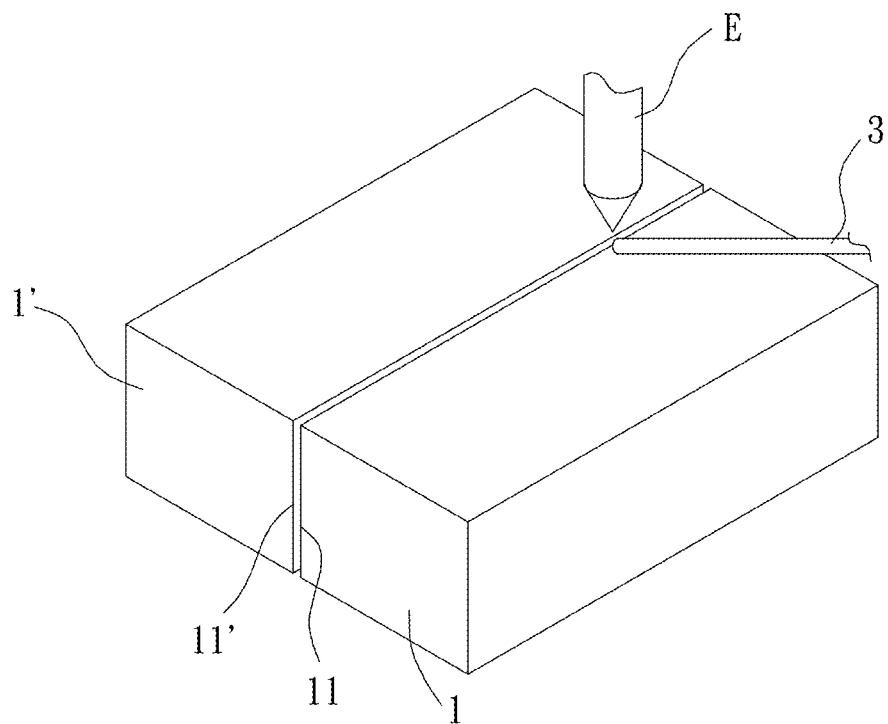
FIG. 4A shows a perspective view of two workpieces to be joined by the welding rod (or the welding wire) utilizing the welding activated flux according to an embodiment of the present invention.
Figure 4B:
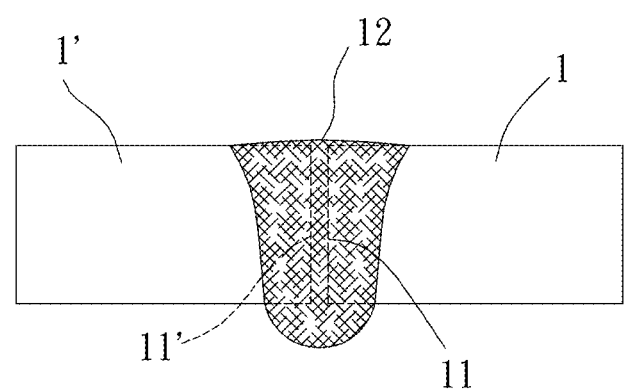
FIG. 4B shows a cross-sectional view of a weld formed by the two joining two workpieces joined by the welding rod (or the welding wire) utilizing the welding activated flux according to an embodiment of the present invention.

Referring to FIG. 4A, the welding arc melts the workpiece and an activated welding rod (or an activated welding wire) 3 to form a welding pool. Referring to FIG. 4B, a narrow, deep weld 12 is formed after the welding pool cools and solidifies.

Figure 5A:
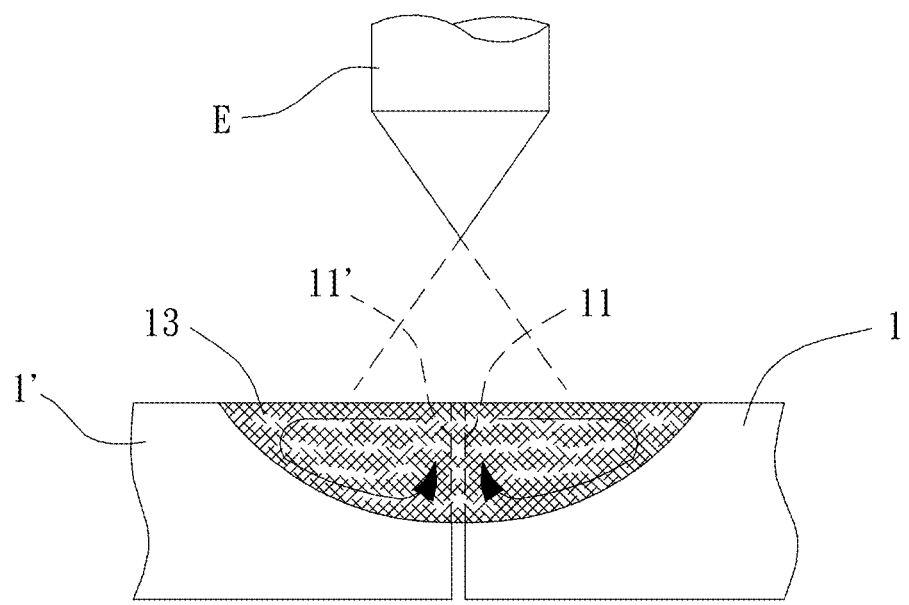
FIG. 5A shows a schematic diagram of a weld, illustrating flow of molten metal in the welding pool made without the welding activated flux according to the embodiment of the present invention.
Figure 5B:
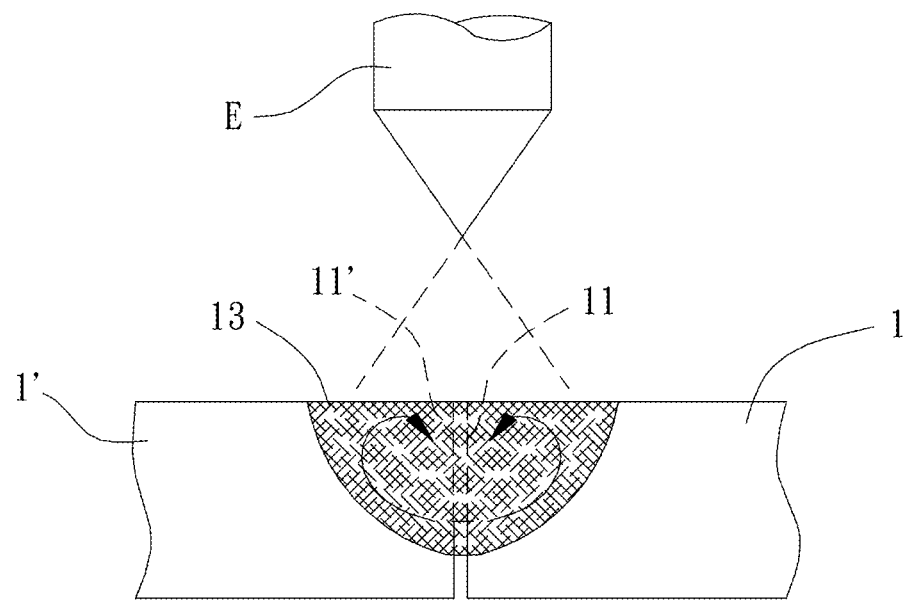
FIG. 5B shows a schematic diagram of a weld, illustrating flow of molten metal in the welding pool made with the welding activated flux according to the embodiment of the present invention.

With reference to FIG. 5A, in a case that the TIG welding process is carried out without the welding activated flux 2, the molten metal flows outward from a center of the welding pool 13 ("the centrifugal surface tension flow"). The weld 12 thus formed is in a wide, narrow shape. On the other hand, with reference to FIG. 5B, in a case that the TIG welding process is carried out with the welding activated flux 2, the surface tension gradient in the welding pool 13 will change, altering the molten metal flows inward towards the center in the welding pool 13 ("the centripetal surface tension flow"). The weld 12 thus formed is in a narrow, deep shape.

The welding activated flux can increase the current density at the surface of the welding pool, generating a stronger downward electromagnetic force in the welding pool 13, thereby increasing the depth of the weld. That is, the addition of the welding activated flux can reduce the HAZ, preventing from the influence on the properties of the structural alloy steel away from the welding site.

As a result, the welding activated flux can effectively increase the depth of the weld, enhancing the mechanical strength of the weldment. Therefore, the obtained weldments have a decreased risk of distortion.

In order to evaluate the use of the welding activated flux can increase the depth of the weld, the following trial is carried out.

The welding activated fluxes used in the trial are shown in TABLE 1, with a controlled trial without the welding activated flux shown as example A0. The welding activated fluxes include the powdered particles each having an average diameter of 53-88 μm, which are mixed in methanol.

TABLE 1

| Examples | $SiO_2$ (wt %) | $MoO_3$ (wt %) | $TiO_2$ (wt %) | $Cr_2O_3$ (wt %) | $FeF_3$ (wt %) |
|---|---|---|---|---|---|
| A0 | 0 | 0 | 0 | 0 | 0 |
| A1 | 50 | 30 | 10 | 10 | 0 |
| A2 | 50 | 25 | 5 | 20 | 0 |
| A3 | 40 | 30 | 10 | 20 | 0 |
| A4 | 45 | 30 | 5 | 15 | 5 |
| A5 | 50 | 25 | 10 | 10 | 5 |
| A6 | 40 | 25 | 5 | 20 | 10 |

AISI 4130 steel plates were used as the workpieces. The workpieces were cut into strips with dimensions of 100 mm in length and 100 mm in width for 5 mm thick plates. Before welding, all workpieces were roughly ground with 240 grit SiC sandpaper to remove surface impurities and then cleaned with acetone. The welding activated fluxes of examples A1-A6 were mixed with methanol and stirred with a glass rod until the mixture attained a paint-like consistency. The flux paste was then coated onto the surface of the workpieces using a paintbrush. The methanol was evaporated, leaving a coated layer attached onto the surface of the workpieces to be joined. The TIG welding was performed using a mechanized system in which the welding torch with a 3.2 mm diameter, 2% thoriated tungsten electrode was moved at a constant speed. An autogenous, single-pass TIG welding process was used to produce a bead-on-plate weld. The welding current and welding speed were 180 A and 140 mm/min, respectively. The electrode tip had an included angle of 60°, and the electrode gap was 2 mm. A high-purity argon gas was used as the shielding gas with a flow rate of 15 L/min. The surface appearance and geometric morphology of the weld were photographed using a metallographic microscope (as shown in FIGS. 6A-12B). Joints were cross-sectioned perpendicular to the welding direction for metallographic analyses. The metallographic samples were then prepared using standard procedures, including sectioning, mounting, and grinding, as well as polishing to a 0.05 μm finish, followed by etching. The samples etched in a solution consisting of 5 mL nitric acid+95 mL alcohol and washed by distilled water. All samples were examined with a Toolmaker's microscope to measure the depth of the weld and the width of the weld (as shown in TABLE 2).

TABLE 2

Figure 6A:
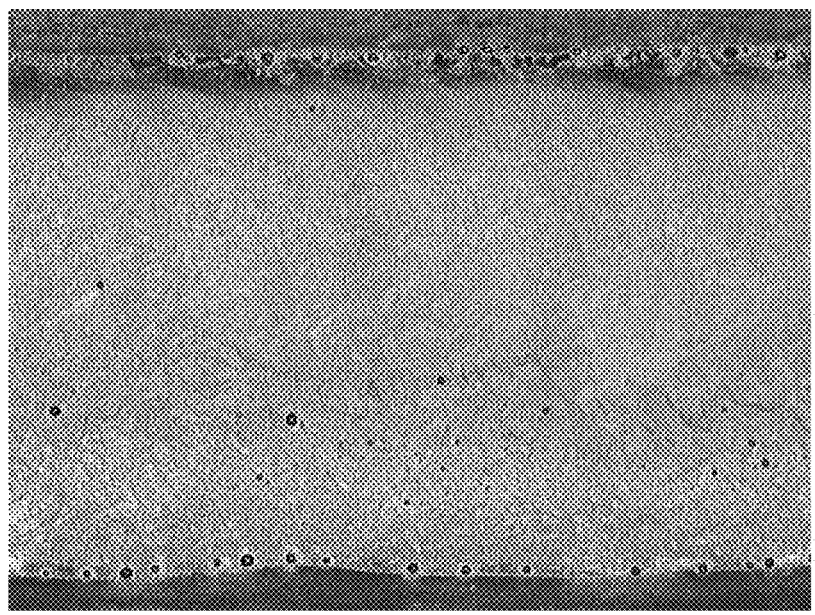
FIG. 6A shows a top view of a surface appearance of the weld of group A0.
Figure 6B:
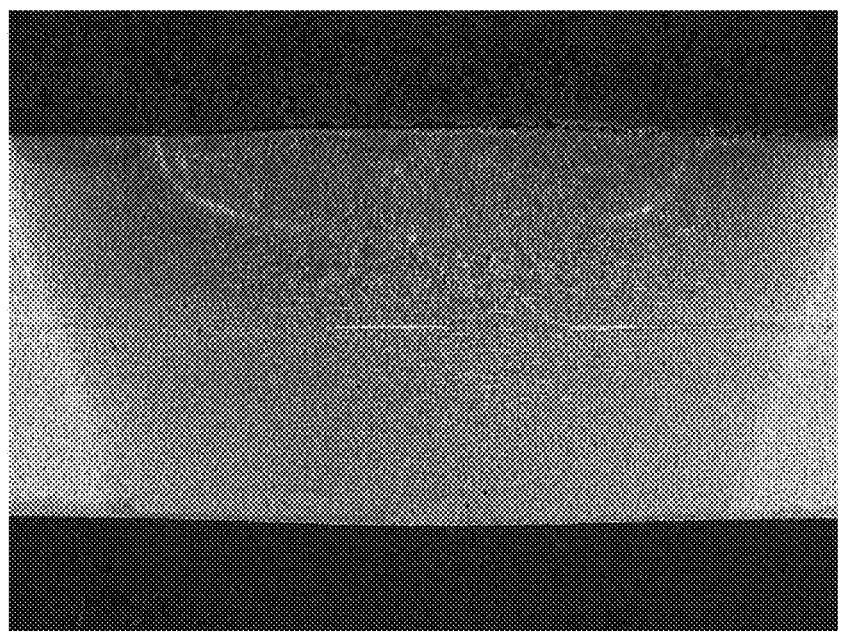
FIG. 6B shows a cross-sectional view of a geometric morphology of the weld of group A0.
Figure 7A:
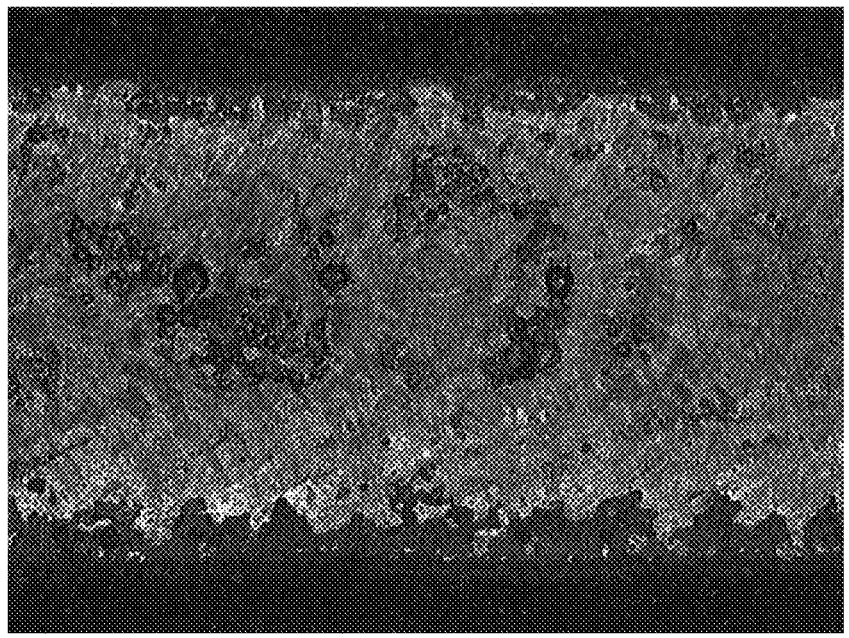
FIG. 7A shows a top view of a surface appearance of the weld of group A1.
Figure 7B:
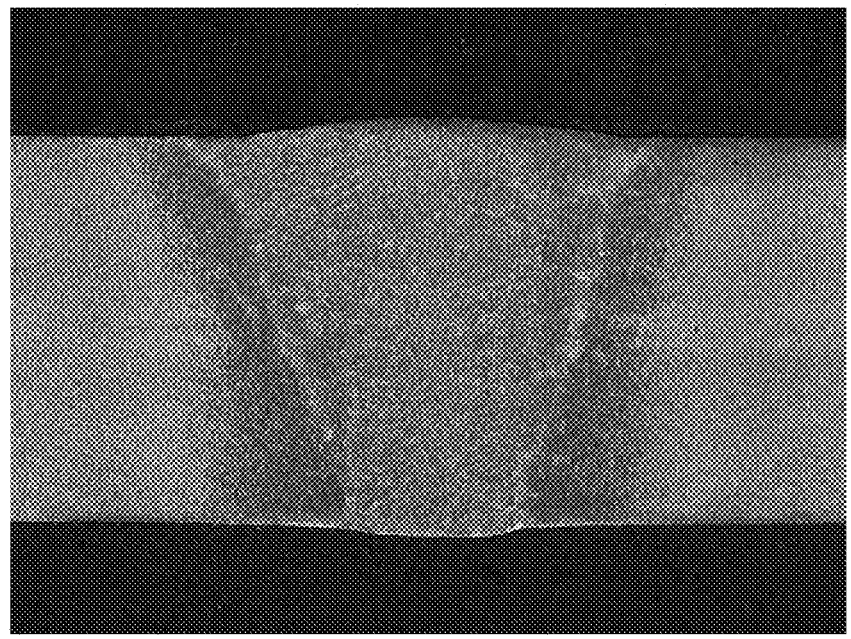
FIG. 7B shows a cross-sectional view of a geometric morphology of the weld of group A1.
Figure 8A:
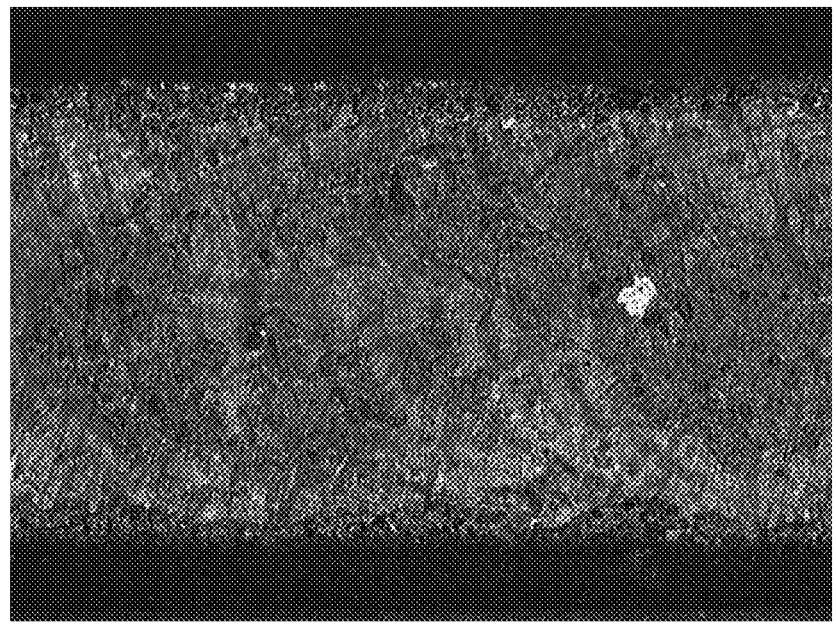
FIG. 8A shows a top view of a surface appearance of the weld of group A2.
Figure 8B:
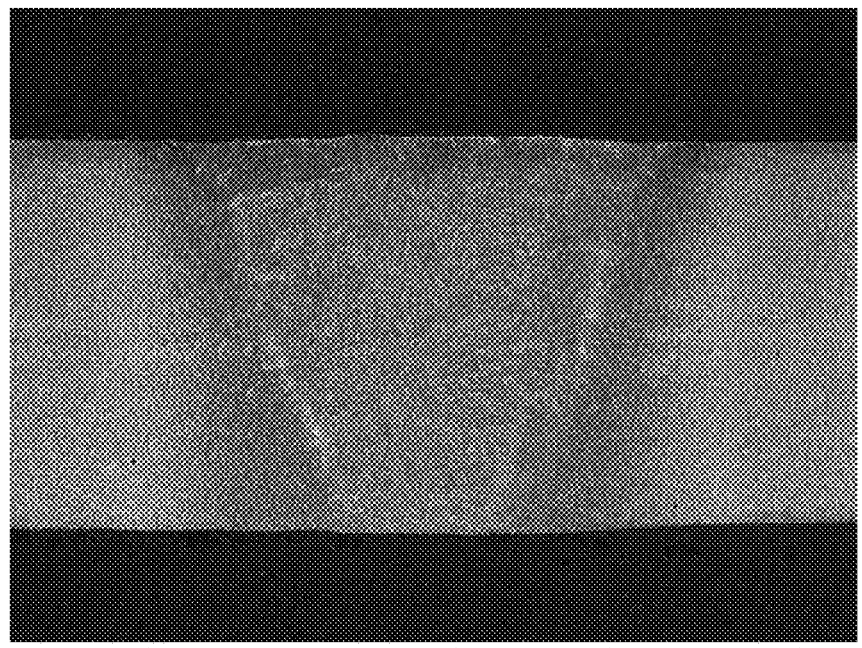
FIG. 8B shows a cross-sectional view of a geometric morphology of the weld of group A2.
Figure 9A:
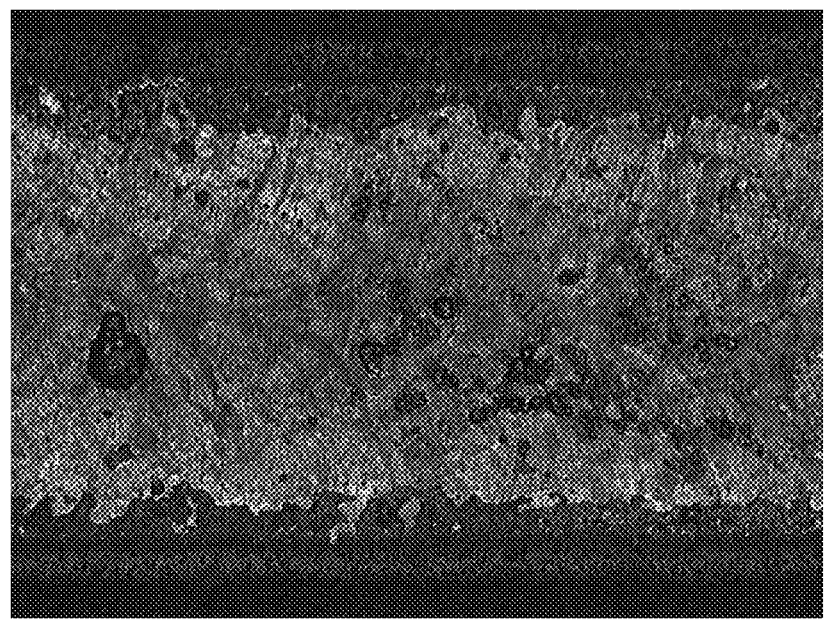
FIG. 9A shows a top view of a surface appearance of the weld of group A3.
Figure 9B:
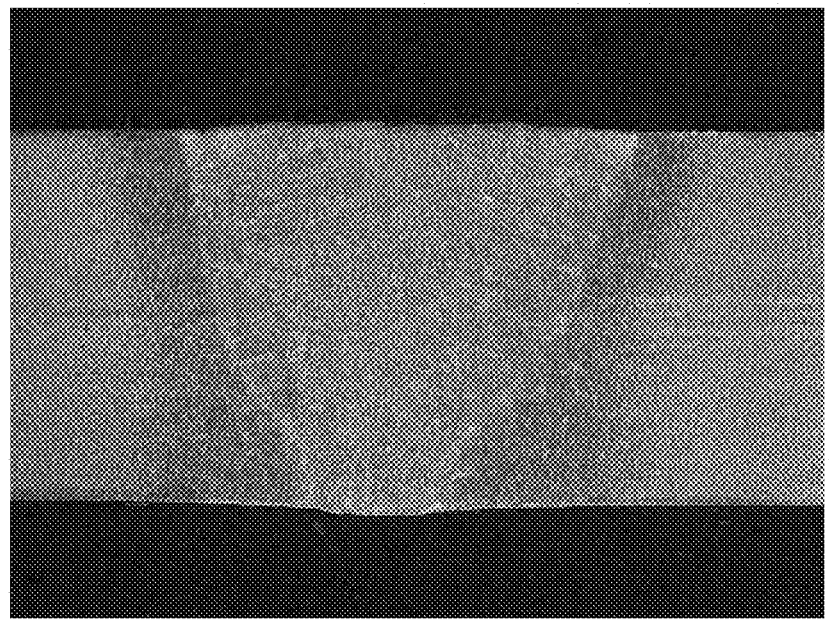
FIG. 9B shows a cross-sectional view of a geometric morphology of the weld of group A3.
Figure 10A:
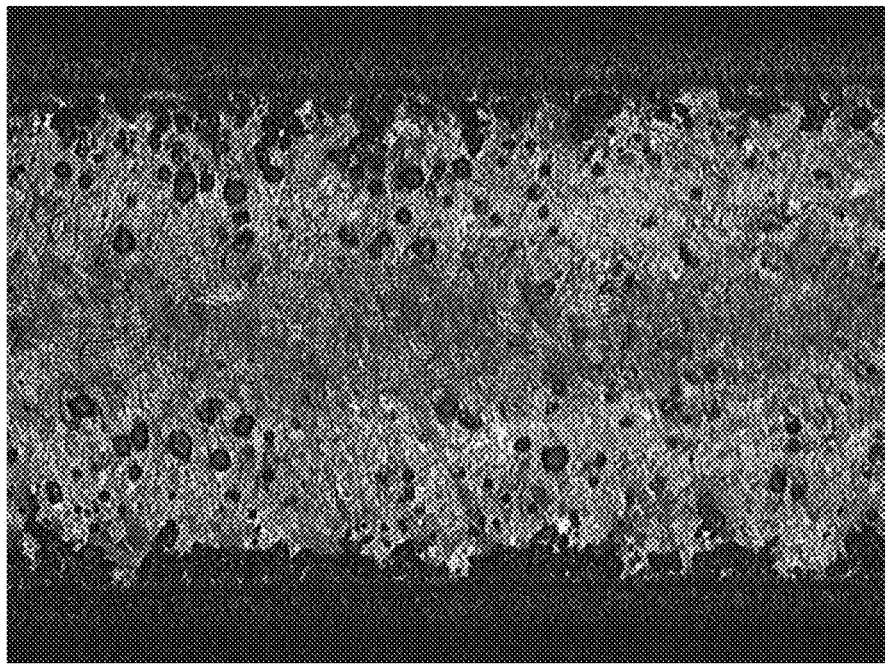
FIG. 10A shows a top view of a surface appearance of the weld of group A4.
Figure 10B:
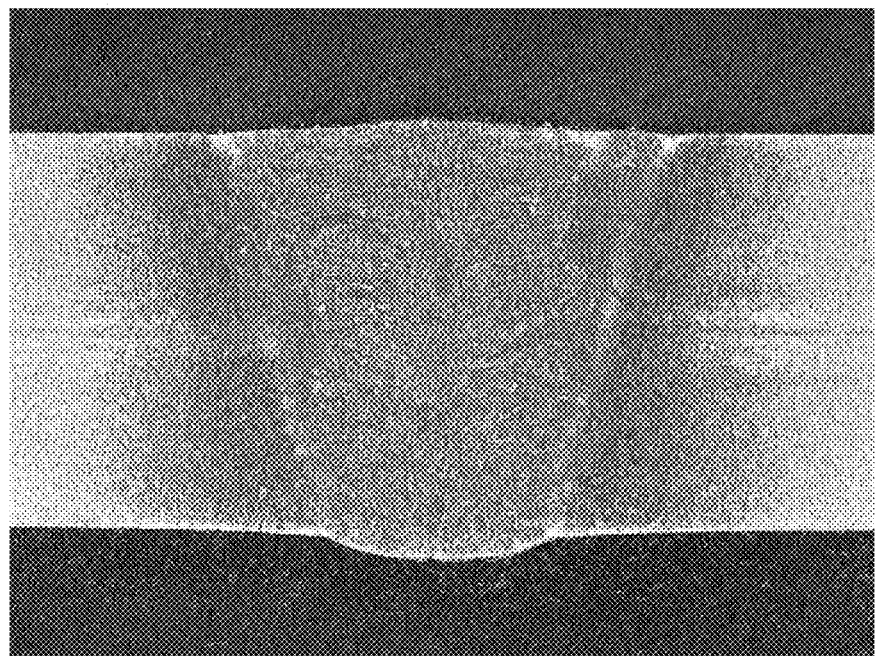
FIG. 10B shows a cross-sectional view of a geometric morphology of the weld of group A4.
Figure 11A:
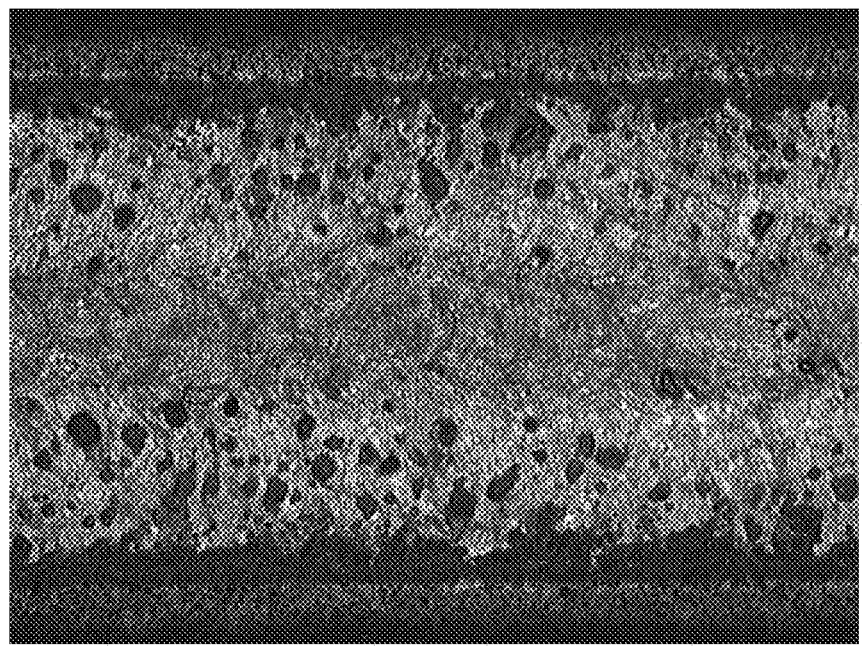
FIG. 11A shows a top view of a surface appearance of the weld of group A5.
Figure 11B:
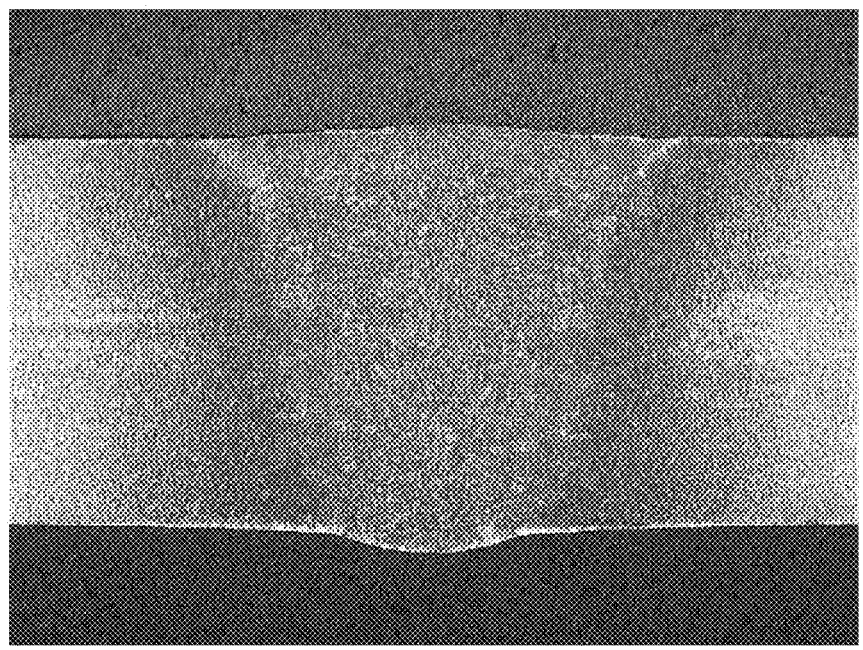
FIG. 11B shows a cross-sectional view of a geometric morphology of the weld of group A5.
Figure 12A:
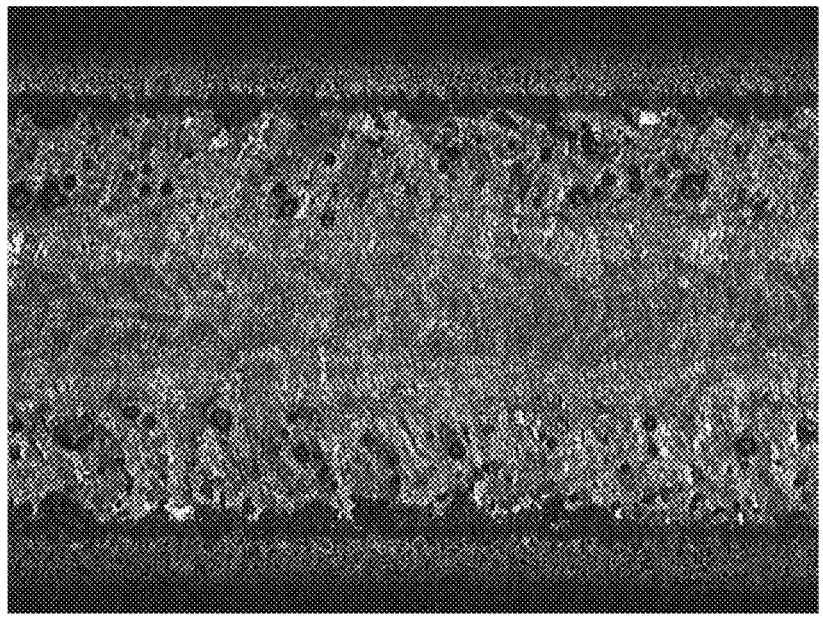
FIG. 12A shows a top view of a surface appearance of the weld of group A6.
Figure 12B:
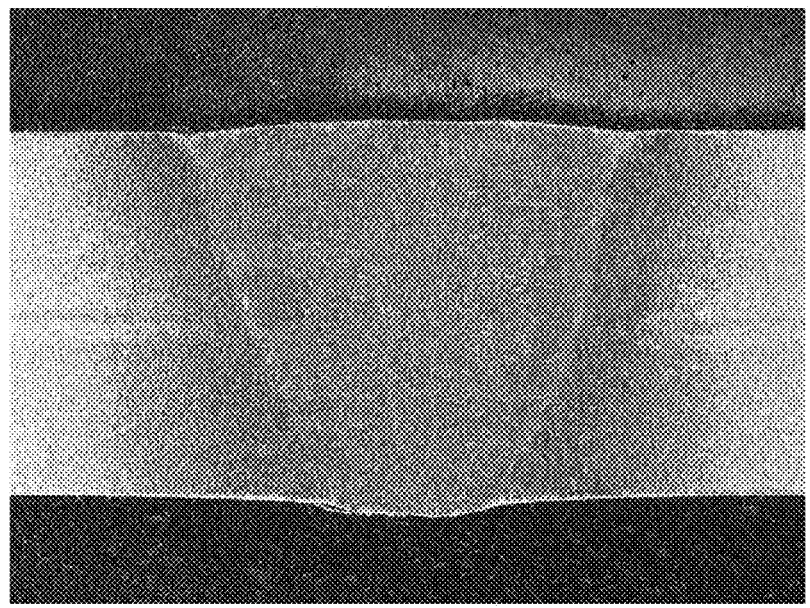
FIG. 12B shows a cross-sectional view of a geometric morphology of the weld of group A6.

| | | | | Metallography | |
|---|---|---|---|---|---|
| Examples | Depth[1] (mm) | Width[2] (mm) | Depth/width ratio | Top view | Cross-sectional view |
| A0 | 1.32 | 6.92 | 0.19 | FIG. 6A | FIG. 6B |
| A1 | 5.13 | 5.98 | 0.86 | FIG. 7A | FIG. 7B |
| A2 | 5.06 | 6.09 | 0.83 | FIG. 8A | FIG. 8B |
| A3 | 5.04 | 6.11 | 0.82 | FIG. 9A | FIG. 9B |
| A4 | 5.29 | 6.02 | 0.88 | FIG. 10A | FIG. 10B |
| A5 | 5.26 | 5.85 | 0.90 | FIG. 11A | FIG. 11B |
| A6 | 5.21 | 6.11 | 0.85 | FIG. 12A | FIG. 12B |

[1]The depth of the weld is the maximum vertical depth from the surface of the weld.
[2]The width of the weld is the maximum horizontal width of the surface of the weld.

Referring to TABLE 2, by the use of the welding activated flux, the welds of Examples A1-A6 show an increased depth compared to Example A0, with 282-289% improvement of Examples A1-A3, and 295-301% improvement of Examples A4-A6. In addition, the full penetration weld can be obtained in Examples A1-A6. Moreover, referring to FIG. 6A-12B, the formed weld has a satisfactory surface appearance.

Thus, with the use of the welding activated flux for structural alloy steels according to the present invention, the surface tension gradient in the welding pool is changed, altering the molten metal flows inward towards the center in the welding pool. Moreover, the current density at the surface of the welding pool is increased, generating a stronger downward electromagnetic force in the welding pool. Therefore, the depth/width ratio of the weld is significantly increased.

In addition, with the increased depth/width ratio of the weld, the weldments have the enhanced mechanical strength, the reduced risk of distortion. Therefore, without the formation of the bevel faces, the welding process is significantly improved by shortening operation time and reducing manufacturing costs including costs of labors, welding rods (or welding wires) and welding gases.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A welding activated flux for structural alloy steels, comprising: 40-50 wt % of $SiO_2$, 25-30 wt % of $MoO_3$, 5-10 wt % of $TiO_2$ and 10-20 wt % of $Cr_2O_3$.

2. The welding activated flux for structural alloy steels as claimed in claim 1, with the welding activated flux further comprising 5-10 wt % of $FeF_3$.

3. The welding activated flux for structural alloy steels as claimed in claim 1, with the welding activated flux comprising a plurality of powdered particles each having an average diameter of 53-88 μm.

\* \* \* \* \*